United States Patent [19]
Hafla et al.

[11] 3,968,415
[45] July 6, 1976

[54] APPARATUS FOR EFFECTING AND CONTROLLING THE INDEXING OF TOOL TURRETS IN MACHINE TOOLS

[75] Inventors: Dietmar Hafla, Hohengehren; Kurt Abele, Nenningen, both of Germany

[73] Assignee: Index-Werke KG Hahn & Tessky, Esslingen, Germany

[22] Filed: Dec. 31, 1974

[21] Appl. No.: 537,787

[30] Foreign Application Priority Data
Jan. 10, 1974  Germany............................ 2401083

[52] U.S. Cl............................ 318/569; 137/596.18; 235/150.1; 235/151.11
[51] Int. Cl.².......................................... G05B 19/18
[58] Field of Search................. 318/569; 235/150.1, 235/151.11; 137/596.17, 596.18

[56] References Cited
UNITED STATES PATENTS

| | | | |
|---|---|---|---|
| 3,222,996 | 12/1965 | Thieme et al................... | 137/596.17 |
| 3,340,447 | 9/1967 | MacDonald......................... | 318/569 |
| 3,580,538 | 5/1971 | Wyrick........................... | 137/596.18 |
| 3,701,220 | 10/1972 | Wespi............................. | 318/569 X |

*Primary Examiner*—B. Dobeck
*Attorney, Agent, or Firm*—Michael J. Striker

[57] ABSTRACT

The turret on a slide of a machine tool is indexible between a plurality of positions in a sequence which is selected by a program. The apparatus for effecting the indexing of turret has a control unit wherein a hydraulic motor can rotate an indexing shaft at different speeds which are determined by the reciprocable spool of a valve regulating the flow of hydraulic fluid from the motor. The spool can be biased against a cam on the indexing shaft by a spring and can be retracted by an electromagnet which is controlled by a decoding unit having several cams on a camshaft which is driven by the turret and several switches which are adjacent to the camshaft. The decoding unit selects the direction of rotation of the motor so as to insure that the indexing of turret from a preceding position to the next-following position does not involve a rotation through more than 180 degrees, and the decoding unit further determines the timing of deenergization of the electromagnet to thus enable the spring to urge the spool against the cam on the indexing shaft immediately before a follower of the spool is in register with a notch machined into the periphery of the cam on the indexing shaft and bounded by a surface which effects gradual deceleration of the motor to zero speed. The turret is automatically unlocked from the slide prior to starting of the motor and is automatically locked to the slide when the motor is arrested.

17 Claims, 6 Drawing Figures

Fig. 3
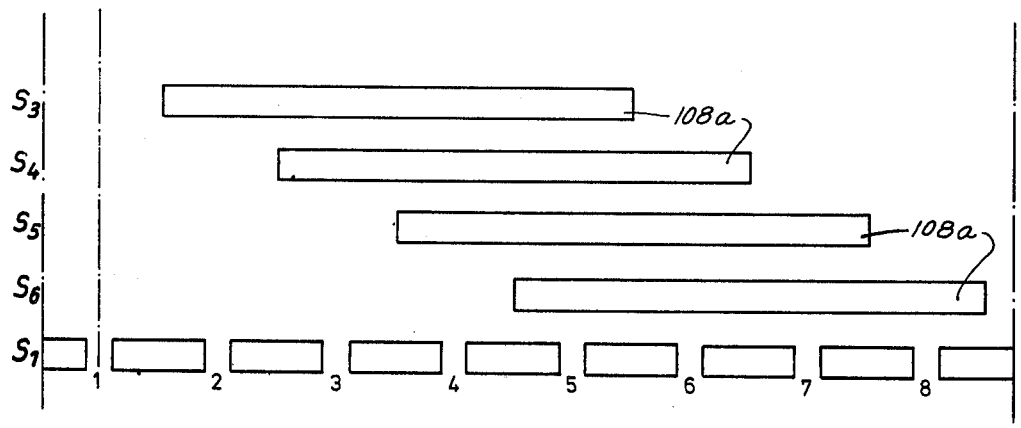
Fig. 4
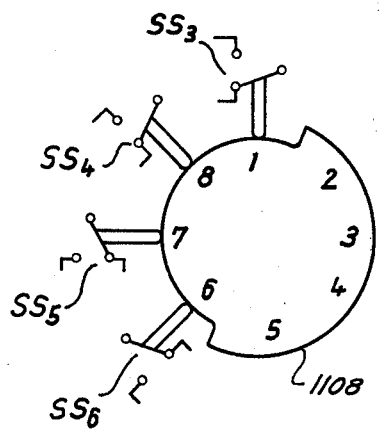
Fig. 5
| | d4 | d3 | d2 | d1 |
|---|---|---|---|---|
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |

APPARATUS FOR EFFECTING AND CONTROLLING THE INDEXING OF TOOL TURRETS IN MACHINE TOOLS

BACKGROUND OF THE INVENTION

The present invention relates to apparatus for effecting and controlling the movements of one or more components to a plurality of preselected positions, especially to apparatus for effecting and controlling angular movements of turrets or analogous tool supporting devices in machine tools to a plurality of positions in accordance with a predetermined program. The apparatus of the present invention can be utilized to effect and control the indexing of a tool turret which is mounted on a slide or carriage in a machine tool wherein a workpiece is rotated by a work spindle and can be treated by a plurality of tools in a predetermined sequence which necessitates repeated indexing of the turret to preselected angular positions in which certain tool or tools are in an optimum position with respect to the workpiece.

It is already known to utilize in a machine tool a computer or analogous programming means which can be set to automatically determine or select the movements of a turret or an analogous indexible tool supporting device to a series of predetermined angular positions. It is also known to utilize in such machine tools control apparatus which are responsive to signals from the programming means and serve to effect the movements of turret to successive angular positions.

The commonly owned German Offenlegungsschrift No. 2,110,147 discloses a control apparatus having means (hereinafter referred to as decoding unit) which insures that the turret can be indexed from a preceding position to the next position within a short interval of time by selecting the direction of rotation of the turret in such a way that the latter need not be indexed through more than 180°. For example, and assuming that the turret is indexible between eight predetermined positions whereby the angular displacement of the turret from any one of the eight positions to one of the two neighboring positions involves rotation through an angle of 45°, the decoding unit insures that the turret can reach any selected position by rotating through an angle of 180°, 135°, 90° or 45°.

The apparatus of the German Offenlegungsschrift No. 2,110,147 further comprises a control unit which includes means for indexing the turret and comprises a prime mover and at least one control element capable of regulating the speed of the prime mover so that the turret is rapidly indexed from the preceding position toward the next position but its speed is reduced shortly before it reaches the next position whereupon the speed of the prime mover decreases gradually to zero speed which is reached at the exact moment when the turret assumes the next position.

A drawback of the apparatus which is described in the just discussed German publication is that it must further comprise a relatively complex and bulky decelerating unit which serves to determine when the speed of the prime mover for the indexible turret is to be reduced from a higher to a lower speed. The decoding and decelerating units respectively comprise a plurality of discrete cams which can actuate electric switches. For example, each of these units can comprise four discrete rotary cams and four limit switches whereby the cams of the decoding unit are adjacent to and coaxial with the cams of the decelerating unit and the four switches of the decoding unit are aligned with the four switches of the decelerating unit. The cams rotate with the turret and together constitute an elongated cam drum.

The axial length of the drum is substantial so that it must be taken into consideration in dimensioning of the turret, i.e., the body or housing of the turret must be made larger for the specific purpose of accommodating the cams of the decoding and decelerating units.

Furthermore, the components of the decelerating unit contribute significantly to the initial and maintenance cost of the control apparatus. The positions of switches of the decelerating unit relative to the respective cams must be selected and maintained with an extremely high degree of accuracy so that such work must be performed by skilled operators. The construction of the control apparatus, especially of the aforementioned control element which effects the deceleration of prime mover for the turret to zero speed, also contributes excessively to the initial and maintenance cost of the control apparatus. The control element is a rotary valve member which must be machined and mounted with utmost precision in order to insure that the turret is invariably arrested at the exact moment when it assumes one of the predetermined angular positions. The rotary valve member comprises a ring which is rigidly mounted on the shaft of the turret and is provided with a plurality of pairwise arranged bores, one pair for each angular position of the turret. Each bore is parallel to the axis of the shaft for the turret. The bores of each pair are connected to discrete conduits for a hydraulic fluid, e.g., oil, whereby the fluid which is admitted via one bore of each pair effects clockwise rotation and the fluid which is admitted via the other bore of the respective pair effects counterclockwise rotation of the turret. The angular spacing of such bores must be highly accurate which is difficult to achieve, especially when the diameter of the ring is relatively small and also because the ring is likely to be distorted in response to changes in temperature. Even extremely minor deviations of the position of one or more bores from a predetermined position will affect the accuracy with which the turret is indexed to one or more angular positions with respect to its slide or carrier. When the speed of the prime mover for the turret is reduced, one or more bores in the aforementioned ring of the control element register with a stationary throttling passage which is connected with a conduit for return flow of hydraulic fluid at atmospheric pressure. Gradual deceleration of the prime mover to zero speed takes place as a result of the flow of hydraulic fluid through a portion of the aforementioned passage whose cross-sectional area decreases gradually. The just described control unit of the control apparatus is quite expensive and prone to malfunction, e.g., if the fluid contains solid impurities. Moreover, the control unit occupies a substantial amount of space which must be provided in addition to the space for the component parts of the aforediscussed decoding and decelerating units. As a rule, the turret is too small to accommodate all three units of the just described control apparatus so that several components of such units must be mounted on and/or adjacent to the shaft for the turret outside of the housing or body of the turret.

SUMMARY OF THE INVENTION

An object of the invention is to provide a relatively simple, compact and inexpensive but reliable apparatus for effecting and controlling the movements of a component to successive ones of a plurality of predetermined positions, particularly for effecting and controlling angular movements (indexing) of a turret or an analogous tool supporting device in a machine tool between a plurality of successive positions which are selected in accordance with a predetermined program.

Another object of the invention is to provide a control apparatus which can be readily installed in a slide or carriage for an indexible tool turret in a programmed single-spindle automatic or another machine tool.

A further object of the invention is to provide a control apparatus which need not be provided with discrete decelerating means for the prime mover which moves the turret or an analogous component between a plurality of predetermined positions and wherein the decoding unit is capable of performing a plurality of functions including selecting the shortest route for moving the component between any two positions as well as timing the deceleration of prime mover shortly or immediately before the component completes its movement from a preceding to the next-following position.

An additional object of the invention is to provide a control apparatus which can automatically lock the component in a newly selected position or automatically unlock the component prior to starting the prime mover which moves the component from a preceding to the next-following position.

The improved apparatus is designed to effect and control the movements of a component to successive ones of a plurality of different predetermined positions, particularly to effect and control angular movements of a turret or an analogous tool supporting device with respect to a slide or carriage in a machine tool to a plurality of successive positions which are selected in accordance with a predetermined program (e.g., by resorting to a digital computer). The improved apparatus comprises basically a control unit and a decoding unit.

The control unit comprises a prime mover (e.g., a hydraulic motor) which is rotatable clockwise and counterclockwise at a plurality of different speeds, an output member (e.g., a shaft which can index the component) which is rotatable by the prime mover, a gear transmission or analogous means for transmitting motion (preferably torque) from the output member to the component, speed regulating means for the prime mover including a cam which is driven by the output member (the cam may be a disk cam which is affixed directly to the output member), a control element (e.g., the reciprocable spool of a valve which controls the flow of hydraulic fluid from the prime mover to a tank or the like) which is movable between a first end position (valve fully open) in which the prime mover is free to rotate the output member at a maximum speed and a second end position (valve closed) in which the prime mover is arrested, means (e.g., a spring) for biasing the control element against the cam (the latter includes a portion which effects a gradual movement of the control element to its second end position under the action of the biasing means while the cam is rotated by the output member), and disengaging means (e.g., a spring) for biasing the control element against the cam (the latter includes a portion which effects a gradual movement of the control element to its second end position under the action of the biasing means while the cam is rotated by the output member), and disengaging means (e.g., an electromagnet) which is operable to move the control element to the first end position.

The decoding unit comprises means for selecting the direction of rotation of the prime mover so as to effect a movement of the component from a preceding position to the next-following position along the shorter of two possible routes including clockwise and counterclockwise rotation of the prime mover, and means for automatically timing the deceleration of the prime mover from the maximum speed. The timing means comprises means for deactivating the disengaging means to thus enable the biasing means to move the control element of the speed regulating means from the first end position.

If the component is indexible between its predetermined positions about a predetermined axis, the output element is preferably a rotary shaft whose axis may be parallel to the axis of the component. The control element is preferably (but need not be) spaced apart from the cam of the speed regulating means when it assumes the first end position under the action of the disengaging means.

The novel features which are considered as characteristic of the invention are set forth in particular in the appended claims. The improved control apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a schematic developed view of certain parts of the decoding unit;

FIG. 4 is a schematic view of a modified decoding unit;

FIG. 5 is a table showing in binary code the conditions of various relays in the electric circuit of the control apparatus for each position of the turret.

DESCRIPTION OF THE PREFERRED EMBODIMENTS

Figure 1:
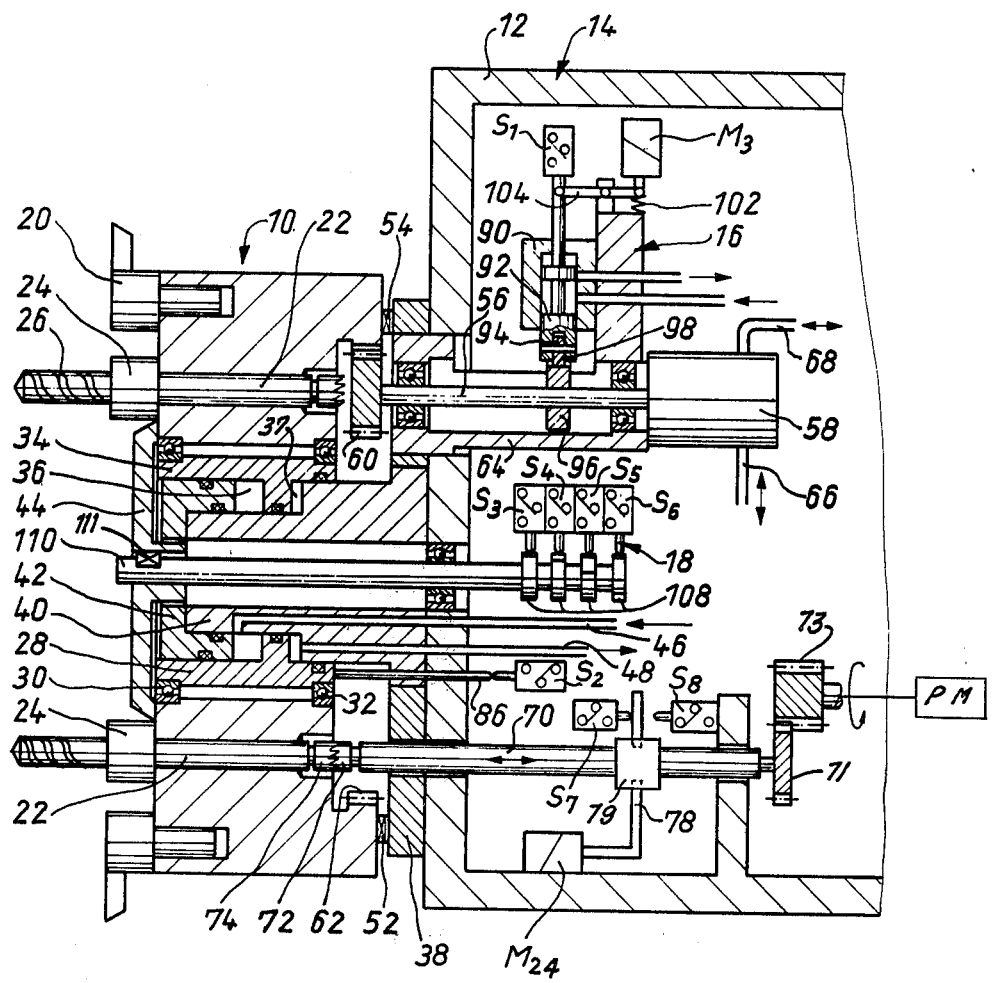
FIG. 1 is an axial sectional view of a tool turret and a fragmentary longitudinal vertical sectional view of a slide which supports the turret, and further showing certain parts of the decoding and control units which form part of the improved apparatus.

FIG. 1 shows a portion of a machine tool whose construction may be similar to that of the machine tool shown in FIG. 1 of German Offenlegungsschrift No. 2,110,147. The machine tool comprises an indexible tool support or turret 10 which is secured to, indexible and axially movable with respect to, and displaceable with the housing 12 of a main slide or carriage 14 corresponding to the slide 4 shown in FIG. 1 of the German publication. The slide 14 is movable axially and transversely of a rotary work spindle (not shown) which is assumed to be located to the left of the turret 10. Prior to indexing, the turret 10 must be shifted axially of the housing 12 by an operating means (in a direction to the left, as viewed in FIG. 1) in order to disengage a locking device including a stationary ring gear 52 on a plate 38 secured to the front side of the housing 12 and a coaxial complementary ring gear 54 at the rear side of the turret 10. The machine tool is operated in accordance with a program selected by a suitable digital computer. The computer determines the sequence in which the turret 10 is to be moved to a series of different angular positions in which the turret maintains selected material-removing tools in an optimum position with respect to a workpiece which is clamped to the rotating work spindle. The selected tools can be caused to penetrate into the rotating workpiece in response to axial or transverse displacement of the slide 14, i.e., in response to movement of the slide in a direction to right or left or in a direction at right angles to the plane of FIG. 1. The means for effecting the indexing movements of turret 10 to successive angular positions with respect to the housing 12 of the slide 14 comprises a control unit 16 and a decoding unit 18, both mounted at least in part in the interior of the housing 12.

The turret 10 is indexing between eight different angular positions with respect to the housing 12 and comprises eight sets of tool holders 20, 24. The tool holders 20 are fixedly secured to the body of the turret 10 and carry removable tools 21. The tool holders 24 are rotatable with respect to the turret 10 and can be connected with drills 26, thread cutters or analogous rotary material removing tools. In the illustrated embodiment, the axes of the rotary tool holders 24 are parallel to the axis of the turret 10. The tool holders 24 are rotatable by discrete spindles 22 which are rotatably mounted in the body of the turret 10 and the rear end portion of each of which carries one element 74 of a claw clutch. The clutch element 74 on the spindle 22 for that rotary tool holder 24 which is adjacent to the rotating workpiece can be coupled to and rotated by a complementary clutch element 72 mounted at the front end of a rotary drive shaft 70 which is axially movably mounted in the housing 12 and is located substantially diametrically opposite a second drive shaft 56 serving as a means for indexing the turret 10. The front end portion of the indexing shaft 56 is rigid with a gear 60 which meshes with an internal gear 62 at the rear end of the turret 10.

The turret 10 is rotatably mounted on but shares all axial movements of an annular bearing member 28. Two or more ball or roller bearings 30, 32 are interposed between the body of the turret 10 and the bearing member 28, and the latter comprises a ring-shaped piston 34 extending into the space between the chambers 36, 37 of a double-acting operating cylinder. The operating cylinder includes an elongated sleeve-like portion 40 which is affixed to and extends forwardly of the aforementioned plate 38 on the housing 12, and a cap 42 which is overlapped by centrally located plate-like cover 44 at the front end of the turret 10. The cap 42 is sealingly and non-rotatably affixed to the front end portion of the sleeve 40. The piston 34 can cause the bearing member 28 to move the ring gear 54 of the turret 10 into or out of mesh with the ring gear 52 on the plate 38.

The chambers 36, 37 of the cylinder 40, 42 respectively communicate with channels 46, 48 which are connected with a solenoid-operated valve 50 (shown in FIG. 2) by way of conduits 112, 114.

The indexing shaft 56 for the turret 10 is rotatable by a hydraulic motor 58 which is connected with a directional control valve 88 (FIG. 2) by conduits 66 and 68. As mentioned above, the indexing shaft 56 is parallel to the axis of rotation of the turret 10 with respect to the housing 12 (i.e., with respect to the common axis of the bearing member 28 and cylinder 40, 42). The transmission ratio of the motion transmitting gear transmission including the gears 60 and 62 is preferably such that the shaft 56 must complete at least one full revolution in order to index the turret through 45 degrees, i.e., through a distance corresponding to that between two neighboring sets of tool holders 20, 24 on the turret. Thus, and assuming that the transmission ratio of the gears 60, 62 is 8:1, the gear 60 must complete eight revolutions in order to index the turret 10 through 360°. It is equally possible to select a transmission ration of 16:1, 24:1, etc., i.e., a ratio mn:1 wherein $n$ is the number of positions of the turret 10 and $m$ is a whole number including one.

The indexing shaft 56 is rotatably mounted in a bearing member 64 which is secured to the plate 38 and extends into the interior of the housing 12. The hydraulic motor 58 can also be mounted on the bearing member 64.

The means for moving the drive shaft 70 axially comprises an electromagnetic M24 having an armature 78 which is connected to a sleeve 79 surrounding the shaft 70. The latter is rotatable in but shares all axial movements of the sleeve 79. The means for rotating the shaft 70 comprises a gear train 71, 73 which receives torque from a variable-speed prime mover PM, e.g., a variable-speed d.-c. motor or a prime mover including a constant-speed a.-c. motor and a variable-speed transmission of any known design.

The armature 78 not only serves as a means for transmitting motion to the drive shaft 70 (i.e., for moving the element 72 of the claw clutch into and out of engagement with the adjacent element 74) but also as a trip for two limit switches $S_7$ and $S_8$ which are installed in the housing 12 of the slide 14. The armature 78 actuates the limit switch $S_7$ when the clutch element 72 engages the clutch element 74 of the spindle 22 which is in axial alignment with the drive shaft 70 whereby the limit switch $S_7$ starts the prime mover PM for the shaft 70. The armature 78 actuates the limit switch $S_8$ when the clutch element 72 is disengaged from the adjacent clutch element 74 whereby the limit switch $S_8$ completes a circuit preparatory to indexing of the turret 10 to a different angular position with respect to the slide 14.

The housing 12 further confines and supports a fixedly mounted safety limit switch $S_2$ which can be actuated by a rod-like trip 86. The latter is reciprocably mounted in the housing 12 and is depressed by the body of the turret 10 to thereby actuate the safety switch $S_2$ when the piston 34 of the bearing member 28 moves the ring gear 54 of the turret 10 into mesh with the ring gear 52 of the plate 38. When the switch $S_2$ is actuated by the trip 86, i.e., when the turret 10 is locked in a selected angular position, the switch $S_2$ interrupts an electrical connection between the decoding unit 18 and a multi-way valve 88 (FIG. 2) which determines the direction of rotation of the hydraulic motor 58 for the indexing shaft 56. The connection between the unit 18 and valve 88 is reestablished when the turret 10 is unlocked, i.e., when the trip 86 is permitted to move to the left and beyond the position shown in FIG. 1 under the action of a helical return spring or the like.

The main function of the control unit 16 is to insure gradual deceleration of the motor 58 from a relatively low speed to zero speed when the turret 10 approaches a selected angular position with respect to the housing 12. When the motor 58 is started, it initially rotates the shaft 56 at a high speed; such speed is reduced to the aforementioned relatively low speed shortly before the turret 10 reaches a selected angular position, and the control unit 16 thereupon insures gradual deceleration of the motor 58 from the low speed to zero speed so that the turret 10 is arrested at the exact moment when it assumes the selected angular position. It is preferred to provide for substantially linear or constant deceleration of the motor 58 from lower speed to zero speed. The angular position of the turret 10 is selected by the aforementioned programming device.

Figure 2:
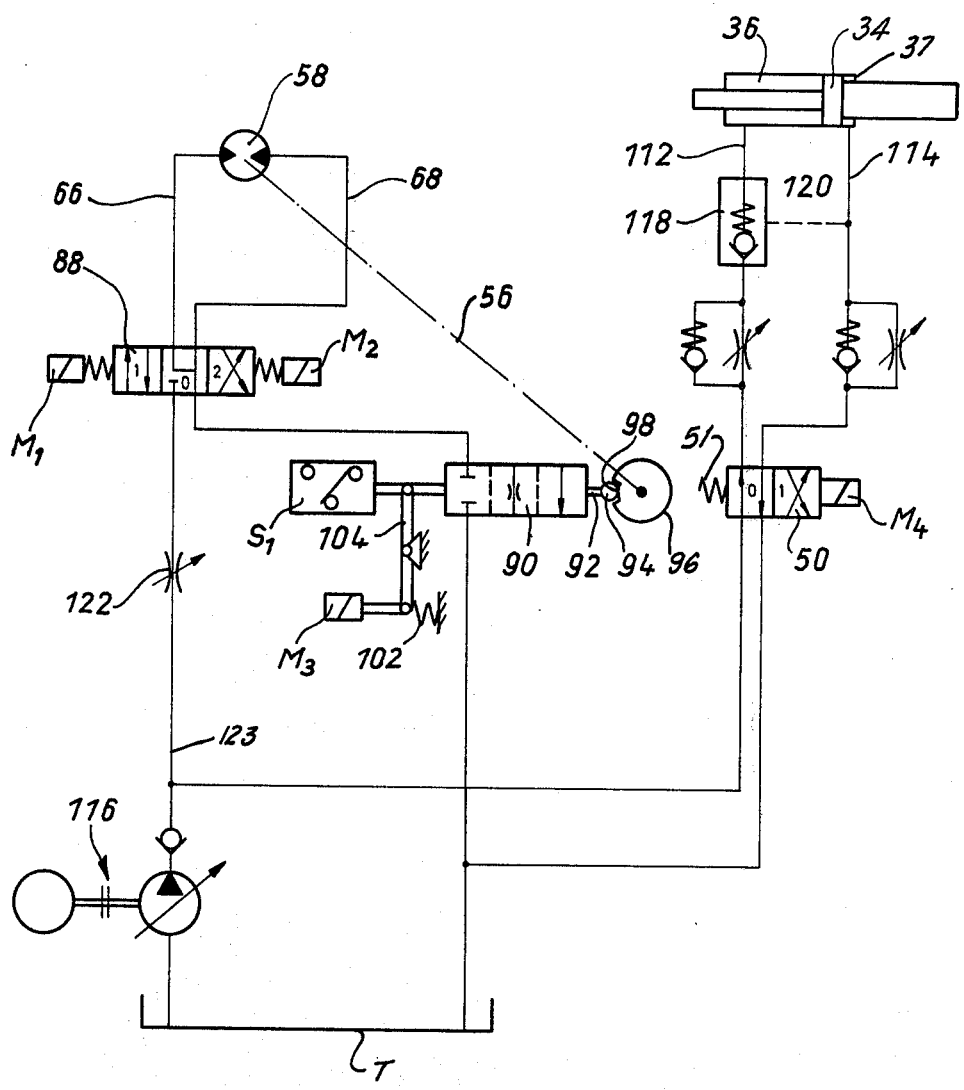
FIG. 2 is a diagrammatic view of the fluid-operated and fluid flow regulating parts of the control apparatus.

The control unit 16 comprises a speed regulating valve 90 having a valve member or spool 92 which constitutes a control element and is movable substantially radially of the indexing shaft 56. The valve 90 is mounted in the housing 12 and its spool 92 has an extension which projects from the body of the valve 90 and carries a roller follower 94 serving to track the peripheral surface of a rotary disk-shaped cam 96 on the indexing shaft 56. As shown in FIG. 1, the body of the valve 90 can be mounted on the bearing member 64 for the indexing shaft 56. The peripheral surface of the cam 96 has a notch 98 bounded by a surface having a centrally located portion located at a minimum distance from the axis of the shaft 56. The surface bounding the notch 98 slopes gradually toward such central portion so that the spool 92 moves gradually to the right, as viewed in FIG. 2, when the roller follower 94 extends into the notch 98 and tracks the adjacent portion of the peripheral surface of the cam 96. The valve 90 thereby gradually throttles the flow of hydraulic fluid through the motor 58 and terminates the flow when the follower 94 bears against the central portion of the surface bounding the notch 98. In the position of FIG. 1 or 2, the spool 92 prevents the flow of any fluid through the motor 58 so that the shaft 56 is at a standstill and the turret 10 is held in one of the eight predetermined angular positions.

The spool 92 is urged in a direction toward the cam 96 by a biasing means here shown as a helical spring 102 through the medium of a two-armed lever 104 which can be pivoted counterclockwise, as viewed in FIG. 2, in response to energization of a disengaging electromagnet $M_3$ whereby the lower arm of the lever 104 stresses the spring 102. The arrangement is such that the electromagnet $M_3$ disengages the follower 94 from the cam 96 as soon as the turret 10 is unlocked, i.e., as soon as the piston 34 has disengaged the ring gear 54 from the ring gear 52. The spool 92 then permits pressurized hydraulic fluid to flow through the motor 58 at a maximum rate so that the shaft 56 begins to rotate at the higher of its two speeds to rapidly index the turret 10 toward the next selected angular position. In accordance with a presently preferred embodiment of the control unit 16, the electromagnet $M_3$ can shift the spool 92 to an end position (i.e., the left-hand end position, as viewed in FIG. 2) in which the roller follower 94 is completely disengaged from the peripheral surface of the cam 96 even if the latter is caused to move beyond the angular position of FIG. 2 in which the notch 98 faces the spool 92.

When the electromagnet $M_3$ is deenergized and the spool 92 assumes its right-hand end position as viewed in FIG. 2, the spool actuates a fixedly mounted switch $S_1$ which is in circuit with the solenoid $M_4$ for the valve 50. The switch $S_1$ causes the valve 50 to effect a return movement of the turret 10 to the locked position (gear 54 meshes with the gear 52) as soon as the spool 92 assumes its right-hand end position (as viewed in FIG. 2) in which the valve 90 arrests the motor 58 and indexing shaft 56.

The purpose of the decoding unit 18 is to insure that, when the turret 10 is to be indexed to the next selected angular position, the motor 58 is caused to rotate in a direction to select the shorter of two routes (clockwise or counterclockwise rotation) for movement of the turret to the next angular position. Moreover, the decoding unit 18 controls the electromagnet $M_3$ for the spool 92 in the valve 90 of the control unit 16. In the illustrated embodiment, the decoding unit 18 comprises a battery of four limit switches $S_3$, $S_4$, $S_5$, $S_6$ which are adjacent to discrete cams 108 on a camshaft 110 rotatably mounted in the plate 38 of the housing 12. The front end portion of the camshaft 110 is coupled for rotation with the cover 44 of the turret 10 by a key 111 which allows the turret 10 to move axially of the camshaft. The axis of the camshaft 110 coincides with the axis of rotation of the turret 10, and the camshaft 110 extends with clearance through the axial bore of the sleeve 40.

The limit switches $S_3$-$S_6$ of the decoding unit 18 serve to determine the direction of rotation of the turret 10; however, in contrast to the construction which is disclosed in German Offenlegungsschrift No. 2,110,147, the improved control apparatus need not have any additional limit switches and/or a relatively expensive BCD-code system for determining that position of the turret 10 (during indexing to a new angular position) in which the higher speed of the shaft 56 must be reduced to the lower speed. The cams 108 are configurated and mounted in such a way that they can cause the decoding unit 18 to deenergize the electromagnet $M_3$ at the exact moment when the higher speed of the motor 58 should be reduced to the lower speed preparatory to gradual deceleration of the turret 10 to zero speed. Thus, the component parts of the decoding unit 18 not only select the direction of rotation of the motor 58 but also the timing of transition from higher or normal speed to a lower speed preparatory to bringing the turret 10 to a standstill in a preselected angular position. Such timing of transition from higher to lower speed can be effected by each of the four cams 108 in cooperation with the associated limit switch $S_3$, $S_4$, $S_5$ or $S_6$. One of these limit switches (namely, that limit switch which is to be actuated shortly before the turret 10 reaches the angular position toward which it is being moved by motor 58) then deenergizes the electromagnet $M_3$ so that the spring 102 can push the spool 92 in a direction to the right in order to move the roller follower 94 into contact with the peripheral surface of the cam 96 on the indexing shaft 56. For example, one of the cams 108 can simply permit or cause the associated limit switch $S_3$, $S_4$, $S_5$ or $S_6$ to open or to cause a substantial change in the voltage supplied to electromagnet $M_3$ and to thereby interrupt the directional signal with the result that the speed of the motor 58 is reduced. This can be achieved by causing a lobe of the corresponding cam 108 to advance beyond the movable portion of the associated limit switch of the decoding unit 18. This also causes that the solenoids $M_1$ and $M_2$ for the valve 88 remain energized due to continuing energization of one of two directional control relays $d_5$ and $d_9$ shown in FIG. 6. The holding circuits of these relays remain energized until the turret reassumes the locked position, thereby causing switch $S_2$ to open.

The relative positions of lobes of the cams 108 which are associated with the limit switches $S_3$-$S_6$ are shown in developed view in FIG. 3. The reference characters "1", "2", "3" ... "8" denote in FIG. 3 the eight angular positions of the turret 10. The lobes 108a of neighboring cams 108 are angularly offset with respect to each other by 45°, i.e., by the angular distance between two neighboring positions of the turret 10. Each of the lobes 108a extends along an arc of 180°. Each of the cams 108 can cause the associated limit switch of the decoding unit 18 to produce two signals.

The decoding unit of FIG. 3 has been found to be especially simple. However, it is also within the purview of the invention to employ other types of decoding units, for example, the one shown in FIG. 4 wherein a single disk-shaped cam 1108 can cooperate with four limit switches $SS_3$, $SS_4$, $SS_5$, $SS_6$ whose movable contacts are depressed or allowed to extend, depending on the angular position of the cam 1108. It is also possible to operate with a reduced number of limit switches, for example by resorting to the Gray code.

The operation:

It is assumed that the turret 10 is locked in one of the eight different angular positions, i.e., that the ring gear 54 meshes with the ring gear 52. If the turret 10 is to move to a different angular position which is determined by the selected program, the first step includes unlocking the body of the turret from the housing 12 of the slide 14. The programming means transmits a signal to the solenoid $M_4$ of the 4/2-way valve 50 so that the valve member of the latter assumes the position "1" which means that the conduit 112, channel 46 and cylinder chamber 36 are disconnected from a source 116 of pressurized fluid (this source may include a conventional motor-pump aggregate which draws oil or another hydraulic fluid from a tank T shown in the lower left-hand portion of FIG. 2). At the same time, the valve 50 connects the outlet of the source 116 with the conduit 114, channel 48 and cylinder chamber 37 so that the piston 34 of the bearing member 28 shifts the turret 10 in a direction to the left, as viewed in FIG. 1, and moves the ring gear 54 ourt of mesh with the ring gear 52 on the plate 38. The conduit 112 contains a check valve 118 which is opened in response to admission of pressurized fluid via conduit 120 which communicates with the conduit 114 whereby the piston 34 can expel fluid from the chamber 36, through the channel 46, check valve 118, conduit 112, valve 50 and into the tank T. The armature 78 of the electromagnet $M_2$ moves the drive shaft 70 to its retracted position not later than when the gear 54 is disengaged from the gear 52, i.e., the clutch element 72 is disengaged from the clutch element 74 of that spindle 22 which registers with the shaft 70.

The trip 86 actuates the safety switch $S_2$ when the turret 10 is free to rotate, i.e., when the gear 54 is disengaged from the gear 52, whereby the switch $S_2$ completes that current path by means of which the decoding unit 18 effects energization of the solenoid $M_1$ or $M_2$ of the directional control valve 88, depending upon whether the shortest route for indexing the turret 10 to the next position is to rotate the turret clockwise or counterclockwise. As mentioned above, the valve 88 determines the direction of rotation of the output element of the hydraulic motor 58 and hence the direction of rotation of the indexing shaft 56. The latter may constitute the output element of the motor 58.

Additionally the electromagnet $M_3$ becomes energized so that the armature of the electromagnet $M_3$ pivots the lever 104 counterclockwise, as viewed in FIG. 2, to stress the spring 102 and to move the valve member 92 of the valve 90 to the fully retracted position in which the roller follower 94 is completely disengaged from the peripheral surface of the cam 96 on the indexing shaft 56. The valve 90 then provides a passage for the maximum flow of fluid from the motor 58 to the tank T. Therefore, the motor 58 rotates the indexing shaft 56 at the higher speed which is determined by the setting of an adjustable flow restrictor 122 in a conduit 123 which connects the outlet of the source 116 with a port of the directional control valve 88. The turret 10 is rotated at the higher speed which is assumed to be 1/8 of the speed of the indexing shaft 56. The speed of the turret 10 is automatically reduced to the lower speed shortly before the turret reaches the new angular position, and the speed of the turret thereupon decreases linearly to zero speed which is reached at the exact moment when the turret assumes the new angular position. The signal for a reduction of the speed of turret 10, i.e., of the motor 58 and shaft 56, is furnished by the decoding unit 18, and such signal results in deenergization of the electromagnet $M_3$ so that the spring 102 is free to expand and to push the follower 94 against the peripheral surface of the cam 96 shortly or immediately before the one or the other end of the notch 98 reaches the follower 94. The valve member 92 gradually throttles the flow of fluid from the motor 58 to the tank T as soon as the roller follower 94 begins to track the surface which bounds the notch 98, and the motor 58 is arrested when the roller follower 94 reaches the deepmost zone of the notch 98. The arrangement may be such that the roller follower 94 engages the cylindrical portion of the peripheral surface of the cam 96 when the electromagnet $M_3$ is deenergized by the decoding unit 18 so that the speed of the motor 58 is reduced rather abruptly while the spring 102 rapidly moves the roller follower 94 into engagement with the cylindrical portion of the peripheral surface of the cam 96, i.e., that the roller follower 94 engages the cam 96 before the shaft 56 moves the one or the other end of the notch 98 into register with the follower.

When the motor 58 is arrested, i.e., when the turret 10 has been indexed to the new angular position the valve member 92 of the valve 90 assumes its right-hand end position, as viewed in FIG. 2, and causes the switch $S_1$ to transmit a signal to the solenoid $M_4$. For example, the switch $S_1$ can open the circuit of the solenoid $M_4$ as soon as the motor 58 is arrested whereby a spring 51 causes the valve member of the valve 50 to assume the position "0" and to admit pressurized fluid into the cylinder chamber 36 (while permitting spent fluid to flow from the chamber 37 back into the tank T) so that the piston 34 moves the turret 10 in a direction to the right, as viewed in FIG. 1, and returns the gear 54 into mesh with the gear 52, i.e., the turret is securely locked in the new angular position. The trip 86 actuates the safety switch $S_2$ when the gear 54 is in full mesh with the gear 52 whereby the switch $S_2$ transmits a signal to the means which controls the lengthwise and/or transverse movement of the slide 14 so that the selected tool or tools of the turret 10 (e.g., the tool 21 or 26 shown in the upper left-hand portion of FIG. 1) can penetrate into the material of a workpiece which is rotated by the work spindle.

The actuation of safety switch $S_2$ by the trip 86 further results in energization of the electromagnet $M_{24}$ which causes its armature 78 to shift the drive shaft 70 to the axial position of FIG. 1 in which the clutch element 72 engages with the clutch element 74 on the adjacent spindle 22, namely on that spindle which can rotate a tool which can penetrate into a workpiece in the particular angular position of the turret 10. The armature 78 actuates the limit switch $S_7$ as soon as the drive shaft 70 returns to the position of FIG. 1 whereby the switch $S_7$ starts the prime mover PM for the gears 73, 71 provided that the treatment of a workpiece which is to be machined in the newly selected angular position of the turret 10 necessitates removal of material by means of a rotary tool (such as a drill, a tapping tool, a thread cutter or the like).

The check valve 118 constitutes an optional but desirable feature of the system shown in FIG. 2; this valve insures that, when one of the channels and/or conduits develops a leak and/or when the source 116 is out of commission, the fluid which fills the cylinder chamber 36 cannot escape so that the turret 10 remains locked in its last angular position because the gear 54 remains in mesh with the gear 52.

Figure 6:
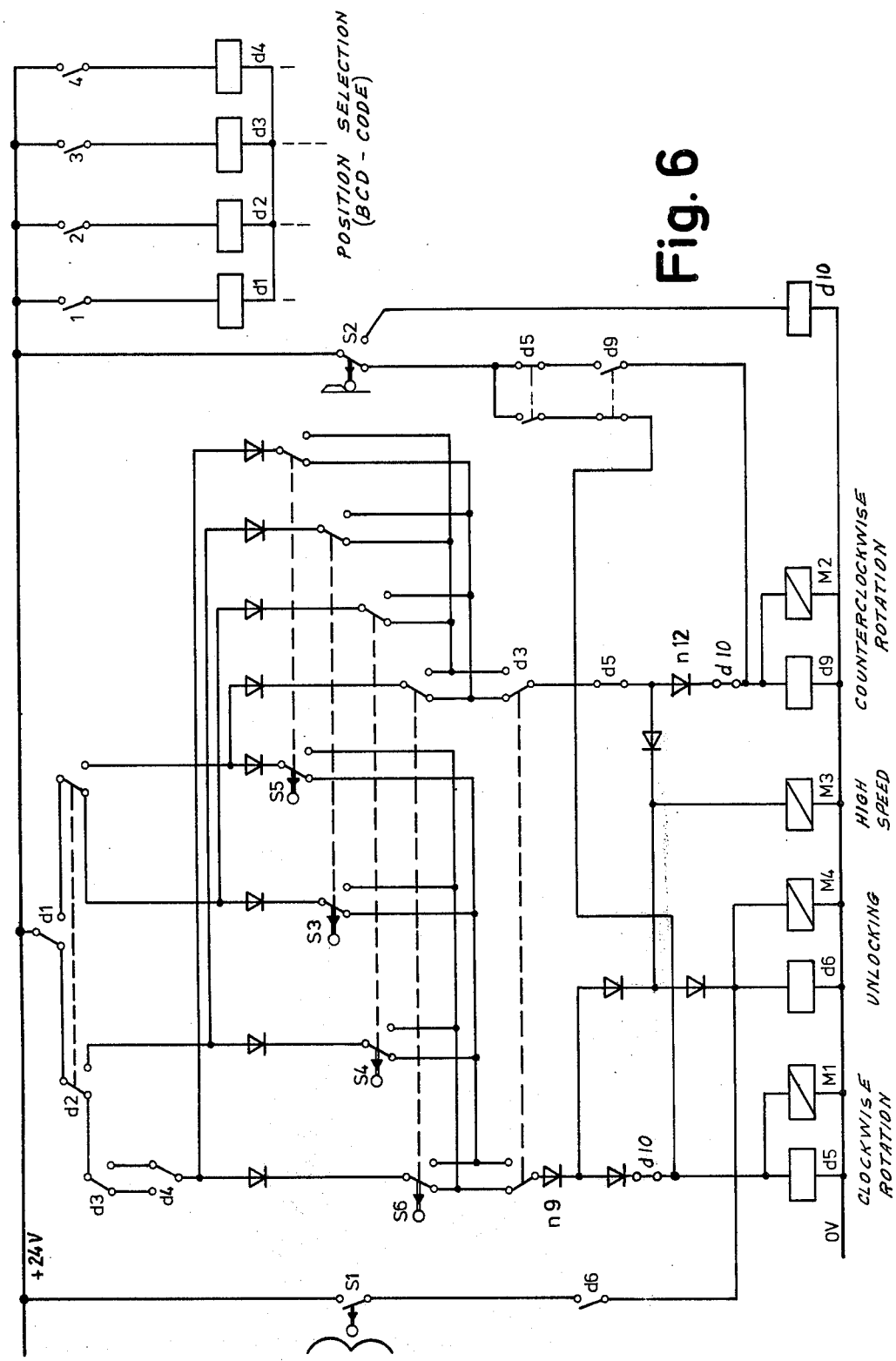
FIG. 6 is a circuit diagram of the control apparatus.

The exact manner in which the turret 10 is indexed to various angular positions will be understood upon perusal of the following Examples with reference to the preceding description and to FIGS. 5–6. The sequence in which the turret 10 moves to successive angular positions is determined by the aforementioned computer in BCD-code. To this end, the computer energizes one or more relays $d_1, d_2, d_3, d_4$ in accordance with a program shown in the table of FIG. 5. The relays $d_1$-$d_4$ determine the direction of rotation of the motor 58. It is assumed that, if the turret 10 is to be indexed through 180° (e.g., from the position "1" to the position 5 or from the position 3 to the position 7 — see FIG. 4), the turret will be rotated clockwise, as viewed in FIG. 4. This is determined by the directional control relay or "right-hand" relay $d_5$ of FIG. 6. Such mode of indexing the turret 10 simplifies the distribution of limit switches $S_3$-$S_6$ in the decoding unit 18. The indexing of Turret 10 in a counterclockwise direction is initiated by the "left-hand" relay $d_9$. A further relay $d_6$ serves to initiate the unlocking of turret 10 prior to indexing to the next angular position.

EXAMPLE I

It is assumed that the Turret 10 dwells in the position 1 (FIG. 4) and that the next angular position of the turret is the position 6. FIG. 4 shows that the shortest route between the positions 1 and 6 is by rotating the turret clockwise through an angle of 135°. FIGS. 4 and 3 show that, when the turret 10 dwells in the position 1 (indicated in FIG. 3 by a vertical phantom line), the lobe of the single cam 1108 (FIG. 4)) or the lobes 108a of the four cams 108 (FIG. 3) are disengaged from the switches $S_3$-$S_6$ of the decoding unit 18. In order to move the turret 10 to the position 6, the computer energizes the relays $d_2$ and $d_3$ (see FIG. 5) and the turret is caused to rotate clockwise, as viewed in FIG. 4.

The limit switches $S_3$ and $S_4$ are connected to the energy source via the normally closed relay contact d, and by the normally open contact $d_2$ (FIG. 6). The switch $S_4$ is closed so that it connects the "right-hand" relay $d_5$ with the energy source via the normally open relay switch $d_3$. $d_5$ remains energized because its holding circuit is completed by the safety switch $S_2$. The relay $d_6$ is energized at the same time to initiate the unlocking of turret 10 by disengaging the gear 54 from the gear 52. The electromagnet $M_3$ is energized so that the valve member 92 is fully retracted and allows the motor 58 to rotate the turret 10 at a maximum speed, i.e., the turret 10 is rapidly indexed in a clockwise direction, as viewed in FIG. 4.

The limit switch $S_3$ is open and allows current to flow to the normally closed relay contact $d_3$. However, the relay $d_3$ is energized and, therefore, there is no flow of current to relay $d_9$ via relay $d_3$.

The turret 10 approaches the position 6 and causes the lobe 108a of one of the cams 108 on the camshaft 110 (which rotates with the turret) to actuate the limit switch $S_4$. The latter deenergizes the relay $M_3$ so that the spring 102 is free to move the valve member 92 in a direction to the right, as viewed in FIG. 2, and to thus move the roller follower 94 against the peripheral surface of the rotating cam 96. This can result in some deceleration of the motor 58 (because the valve member 92 begins to throttle the outflow of fluid from the motor 58) and the speed of the motor 58 begins to decrease linearly toward zero speed as soon as the roller follower 94 begins to track that portion of the peripheral surface of the cam 96 which surrounds the notch 98. The direction of rotation of the motor 58 remains unchanged all the way to the very moment of stoppage because the holding circuit of the relay $d_5$ remains completed due to the fact that the switch $S_2$ is still closed. The holding circuit of the relay $d_6$ is also still completed and this relay is connected with the energy source via switch $S_1$, i.e., the turret 10 remains unlocked to the very moment when the motor 58 is arrested. The diodes shown in FIG. 6 insure that the relay $d_5$ cannot energize the electromagnet $M_3$.

When the roller follower 94 reaches the deepmost zone of the notch 98, the valve 90 prevents any further flow of fluid from the motor 58 to the tank T. The switch $S_1$ is opened in automatic response to movement of the valve member 92 to the right-hand end position, as viewed in FIG. 2 (i.e., in response to complete stoppage of the motor 58), whereby the relay $d_6$ is deenergized and the turret 10 is locked in the new angular position. This results in opening of the safety switch $S_2$.

EXAMPLE II

It is assumed that the turret 10 is to be indexed from the position 1 to the position 8. As mentioned above, the switches $S_3$-$S_6$ of the decoding unit 18 are not actuated when the turret 10 dwells in the position 1 (see the vertical phantom line in FIG. 3). FIG. 5 shows that, in order to index the turret 10 to the position 8, the computer must energize the relay $d_4$, and FIG. 6 shows that energization of relay $d_4$ entails a connection of limit switches $S_5$ and $S_6$ to the energy source by way of the contacts of relays $d_1$ to $d_4$. The "right-hand" relay $d_5$ is energized by way of the limit switch $S_6$ and normally closed relay contact $d_3$; i.e., the turret 10 will be indexed clockwise, as viewed in FIG. 4, through an angle of 45°.

The switch $S_5$ is not depressed so that it can apply voltage to the normally open relay contact $d_3$. Since the relay $d_3$ is not energized (see the lowermost row of the table shown in FIG. 5), the relay $d_9$ cannot receive current via switch $S_5$.

The next-following stages of indexing of the turret 10 to the position 8 take place in the same way as described in the Example I.

EXAMPLE III

It is assumed that the turret 10 dwells in the position 1 and is about to be indexed to the position 5, i.e., through an angle of 180°. Thus, the turret 10 must be indexed clockwise, as viewed in FIG. 4. In order to initiate the indexing of turret 10 to the position 5, the computer energizes the relays $d_1$ and $d_3$ (see the table of FIG. 5). The energized relays $d_1$ and $d_3$ apply voltage to the corresponding terminals of the limit switches $S_3$ and $S_6$. The switch $S_3$ is not depressed by the lobe 108a of the respective cam 108 and allows current to flow to the "right-hand" relay $d_5$. The switch $S_6$ is also not depressed and applies voltage to the normally closed relay contact $d_5$ which is energized and thus insures that the left-hand relay $d_9$ cannot be energized. From thereon on, the indexing of turret 10 to the position 5 takes place in the same way as described in the Example I.

EXAMPLE IV

It is assumed that the turret 10 is to be indexed from the position 1 to the position 3. As shown in FIG. 4, this necessitates rotation of the turret in a counterclockwise direction (through an angle of 90°). The computer has energized the relays $d_1$ and $d_2$ (see FIG. 5) whereby the contacts of these relays apply voltage to the corresponding terminals of the switches $S_4$ and $S_5$. The switch $S_5$ is not depressed by the lobe 108a of the respective cam 108 so that it applies voltage to the normally open relay contact $d_3$. The relay $d_3$ is not energized so that the relay $d_5$ (clockwise rotation of the turret 10) cannot be energized. The switch $S_4$ applies voltage to the normally closed relay contact $d_3$ which energizes the relay $d_9$ so that the latter initiates a counterclockwise rotation of the turret 10. From there on, the indexing of turret 10 to the position 3 takes place in the same way as described in the Example I.

To briefly review the operation of the circuit of FIG. 6 in general terms:

The switch $S_1$ is open whenever the winding $M_3$ is energized.

The switch $S_2$ closes when the turret assumes the fully unlocked position—i.e., when the turret has moved axially to the left end position. The switch $S_2$ opens when the turret reassumes the fully locked position—i.e., when the turret has moved axially to the right end position shown in FIG. 1.

The combined settings of the switches 1, 2, 3, 4, in the current paths of relay windings $d_1$, $d_2$, $d_3$, $d_4$, together represent the desired angular position of the turret.

The combined settings of the switches $S_3$, $S_4$, $S_5$, $S_6$ together represent, in effect, the actual angular position of the turret.

When the desired turret angular position (indicated by the combined settings of switches 1, 2, 3, 4) corresponds to the actual turret angular position (indicated in effect by the combined settings of switches $S_3$, $S_4$, $S_5$, $S_6$), then no current flows from the +24 V line through the switches $S_3$, $S_4$, $S_5$, $S_6$.

When the desired turret angular position does not correspond to the actual turret angular position, then low-magnitude current flows from the +24V line through one or more switches $S_3$-$S_6$ and through windings $d_6$, $M_4$, and $M_3$.

Also, depending upon whether the shortest distance between the desired and actual turret positions involves clockwise or counterclockwise rotation, low-magnitude current from the +24V line will additionally flow through one or more switches $S_3$-$S_6$ and through either windings $d_5$, $M_1$ or $d_9$, $M_2$.

This low-magnitude current is of sufficient magnitude to activate the switches associated with relay windings $d_6$ and $d_5$ or $d_9$, and is of sufficient magnitude to activate the valves controlled by solenoids $M_4$ and $M_3$. However, this current is too low to activate the valve 88 controlled by the solenoids $M_1$, $M_2$.

The activation of the valve associated with solenoid $M_4$ causes the turret to move from the locked position in FIG. 1 to the unlocked position.

The activation of solenoid $M_3$ causes valve 90 to move to fully open position, and closes switch $S_1$. However, the turret does not yet rotate because valve 88 is still in the neutral position.

When the turret reaches the unlocked position, switch $S_2$ closes. Depending upon whether clockwise or counterclockwise turret rotation is appropriate, the switches associated with either relay $d_5$ or else relay $d_9$ will be activated. As a result, higher-magnitude current will flow from switch $S_2$ either into the parallel combination of solenoids $d_5$, $M_1$ or else into the parallel combination of solenoids $d_9$, $M_2$.

Depending upon whether the high-value current from $S_2$ now energizes $M_1$ or $M_2$, hydraulic motor 58 will turn the turret clockwise or counterclockwise.

During the rotation of the turret, until the turret approaches the desired angular position, the discrepancy between the settings of switches 1, 2, 3, 4, on the one hand, and the settings of switches $S_3$, $S_4$, $S_5$, $S_6$, on the other hand, will continue to exist.

When the turret approaches but has not yet reached the desired angular position, the discrepancy between the settings of switches 1, 2, 3, 4, on the one hand, and the settings of switches $S_3$, $S_4$, $S_5$, $S_6$, on the other hand, disappears.

Accordingly, current from the +24V line no longer flows through one or more of switches $S_3$, $S_4$, $S_5$, $S_6$ to the various solenoids.

In particular, high-speed solenoid $M_3$ becomes completely deenergized, as a result of which valve 90 comes under the control of deceleration-control cam 96. The turret continues to rotate into exactly the desired angular position, but at a decreasing speed, as the cam 96 effects increasing throttling of the valve 90.

The switch $S_1$ had previously been maintained closed by the energization of solenoid $M_3$. With $M_3$ now deenergized, $S_1$ is maintained closed only by virtue of cam 96. However, as soon as the turret reaches exactly the desired angular position, the cam 96 causes the switch $S_1$ to open.

In contrast to solenoid $M_3$ which becomes deenergized, as just explained, windings $d_6$ and $M_4$ remain fully energized and activated, due to the self-locking action provided by relay switch $d_6$. Accordingly, the turret remains in the unlocked position until the turret reaches exactly the desired angular position. When such angular position is exactly reached, the switch $S_1$ opens, terminating the self-locking action of winding $M_4$. As a result, the turret shifts axially back to the locked position of FIG. 2.

When such locked position is reassumed, the switch $S_2$ opens, deenergizing whichever pair of windings $d_5$, $M_1$ or $d_9$, $M_2$ was energized, and causing valve 88 to reassume the neutral position.

The automatic turret indexing operation is now complete.

The switch $S_2$, which opens when the turret reassumes the fully locked position of FIG. 1, is connected to a non-illustrated trip device which effects energization of solenoid $M_{24}$ (FIG. 1). As a result, the drive shaft 70 is shifted by armature 78 axially leftwards to the FIG. 1 position, causing clutch components 72, 74 to become engaged. This movement of armature 78 activates switch $S_7$. Switch $S_7$ then starts the prime mover PM for the gears 73, 71 applies a signal to the control computer for the machine tool. Upon receipt of such signal, the control computer maintains solenoid $M_{24}$ energized for a preselected time, and causes preselected movements of the workpiece carriage to occur, for example. Upon elapse of the preselected time, the control computer deenergizes solenoid $M_{24}$, thereby decoupling clutch 72, 74. Next, the control computer changes the combined settings of the switches 1, 2, 3, 4 in the current paths of relay windings $d_1$, $d_2$, $d_3$, $d_4$, and a new indexing operation is performed.

It will be clear that the control computer for the machine tool can be a conventional step-by-step programmer.

The portion of the control computer which actually controls the setting of the switches 1, 2, 3, 4 can be a distinct circuit, for example four parallel-connected shift registers sharing a common clock-signal input. The four outputs of the four shift registers are each associated with a respective one of the switches 1, 2, 3, 4, which may for example be transistor switches. Each time the angular position of the turret is to be changed, the other portion of the control computer applies one clock signal to the common clock-signal input of the four shift registers, thereby effecting a change of the combined settings of switches 1, 2, 3, 4, and thereby initiating the automatic indexing operation described above.

The improved control apparatus is susceptible of many additional modifications without departing from the spirit of the invention. For example, the disk-shaped cam 96 can be replaced by other types of cams, and this cam need not be mounted directly on the indexing shaft 56 for the turret 10, e.g., such cam can be mounted on a separate shaft which is provided in addition to the shafts 110, 56 or constitutes the shaft 110.

It is also possible to provide a mechanical connection between the decoding unit 18 and the control unit 16, e.g., the switch means of the decoding unit can be replaced by a system of cams or the like serving to insure that the follower 94 of the valve member 92 is allowed to move into engagement with the cam 96 immediately or shortly before the notch 98 begins to face the follower. The cam 96 can be mounted directly on the shaft 110 and the shaft 56 omitted, provided that the motor 58 is designed to directly drive the shaft 100. The illustrated construction is preferred because the length of the camshaft 110 can be reduced, i.e., the latter need not carry any cams other than those which actuate the switches of the decoding unit 18.

The drive shaft 70 may be mounted in such a way that its axis makes an acute angle with the axis of the indexing shaft 56. Since the shaft 70 need not extend into the body of the turret 10, it can drive each such spindle 22 which is at the working station in the corresponding angular position of the turret. This constitutes an improvement over certain heretofore known machine tools, e.g., that which is disclosed in German Auslegeschrift No. 1,602,976.

An advantage of the improved control apparatus is that its parts occupy little room and, therefore, the body of the turret 10 need not be enlarged for the sole purpose of accommodating one or more bulky parts of the apparatus. The entire control apparatus can be readily installed in the housing 12 and the only part which extends into the turret 10 is the camshaft 110.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims.

1. Apparatus for effecting and controlling the movements of a component to a plurality of successive predetermined positions, particularly for effecting and controlling angular movements of a tool supporting device in a machine tool to a plurality of successive positions which are selected in accordance with a predetermined program, comprising a control unit including a prime mover which is rotatable clockwise and counterclockwise at a plurality of speeds, an output member rotatable by said prime mover, means for transmitting motion from said output member to said component, speed regulating means for said prime mover including a cam driven by said output member, a control element movable between a first end position in which said prime mover is free to rotate said output member at a maximum speed and a second end position in which said prime mover is arrested, means for biasing said control element against said cam, said cam having a portion which effects a gradual movement of said control element to said second end position under the action of said biasing means, and disengaging means operable to move said control element to said first end position; and a decoding unit having means for selecting the direction of rotation of said prime mover so as to effect a movement of said component from a preceding position to the next following position along the shorter of two possible routes including clockwise and counterclockwise rotation of said prime mover and means for timing the deceleration of said prime mover from said maximum speed, said timing means including means for deactivating said disengaging means to thus enable said biasing means to move said control element from said first end position.

2. Apparatus as defined in claim 1, wherein said component is indexible between said predetermined positions about a predetermined axis and said output element is a rotary shaft, said cam being affixed to said shaft and said control element being spaced apart from said cam in said first end position thereof.

3. Apparatus as defined in claim 2, wherein said disengaging means comprises an electromagnet which is energizable by said decoding unit.

4. Apparatus as defined in claim 1, wherein said prime mover comprises a hydraulic motor and said speed regulating means comprises a valve having a reciprocable valve member which constitutes said control element.

5. Apparatus as defined in claim 1, wherein said component is indexible between said predetermined positions and said output member is a rotary shaft, said motion transmitting means comprising a transmission arranged to rotate said component at a speed which is a fraction of the speed of said shaft, the speed of said shaft being a whole multiple of the speed of said component.

6. Apparatus as defined in claim 5, wherein said shaft completes a full revolution for each movement of said component from a given position to one of the two neighboring positions.

7. Apparatus as defined in claim 5, wherein the ratio of the speeds of said shaft and said compound is mn:1 wherein n is the number of said predetermined positions and m is a whole number including one.

8. Apparatus as defined in claim 1, wherein said component is indexible between said positions about a predetermined axis and said output member is a rotary shaft having a second axis parallel to said predetermined axis.

9. Apparatus as defined in claim 8, wherein said decoding unit comprises a second shaft which is parallel to said first mentioned shaft and is driven by said component, a plurality of second cams provided on said second shaft and a plurality of switches adjacent to and actuatable by said second cams in predetermined angular positions of said second shaft.

10. Apparatus as defined in claim 9, wherein said switches constitute said timing means.

11. Apparatus as defined in claim 1, further comprising means for locking said component in said predetermined positions and operating means for engaging and disengaging said locking means.

12. Apparatus as defined in claim 11, wherein said component is indexible between said positions about a predetermined axis and said locking means comprises a stationary gear and a second gear on said component said gears being coaxial with said component and said operating means including an arrangement for moving said component and said second gear axially to thereby place said second gear into or out of mesh with said first gear.

13. Apparatus as defined in claim 12, wherein said control unit further comprises means for actuating said operating means to move said second gear into mesh with said first gear in response to stoppage of said prime mover.

14. Apparatus as defined in claim 13, wherein said actuating means for said operating means comprises a switch which is actuated by said control element in said second end position thereof.

15. Apparatus as defined in claim 1, wherein said component is indexible between said positions about a predetermined axis, and further comprising at least one holder rotatable in said component about a second axis parallel to said predetermined axis, a rotary drive shaft registering with said holder in one of said predetermined positions of said component, a second prime mover for said drive shaft, means for coupling said drive shaft with said holder in response to completed indexing of said component to said one predetermined position, and means for starting said second prime mover in response to completed coupling of said drive shaft to said holder.

16. Apparatus as defined in claim 15, wherein said output member is parallel to said drive shaft.

17. Apparatus as defined in claim 15, wherein said starting means comprises a switch which is activated by said coupling means.

\* \* \* \* \*